US005855800A

United States Patent [19]

Serenkin

[11] Patent Number: 5,855,800

[45] Date of Patent: Jan. 5, 1999

[54] METHOD FOR VARYING THE EXPOSURE OF DRAINAGE SCREEN SECTION WITHIN A CENTRIFUGAL SEPARATOR

[75] Inventor: Arnold B. Serenkin, Lake Hopatcong, N.J.

[73] Assignee: National Conveyors Company, Fairview, N.J.

[21] Appl. No.: 4,887

[22] Filed: Jan. 9, 1998

Related U.S. Application Data

[62] Division of Ser. No. 631,564, Apr. 12, 1996, Pat. No. 5,788,861.

[51] Int. Cl.[6] ..................................................... B01D 21/26

[52] U.S. Cl. .......................... 210/781; 210/784; 210/787; 210/369; 494/37

[58] Field of Search ..................................... 210/781, 784, 210/787, 360.1, 369, 380.3, 497.01; 494/37, 36, 43, 60

[56] References Cited

U.S. PATENT DOCUMENTS 3,799,353 3/1974 Pause .
4,135,659 1/1979 Derton et al. .
4,518,621 5/1985 Alexander .

*Primary Examiner*—David A. Reifsnyder
*Attorney, Agent, or Firm*—Alix, Yale & Ristas, LLP

[57] ABSTRACT

A centrifugal separator includes a chip bowl for receiving a fluid-particulate mix and delivering the mix onto the screening surface of a cylindrical separator screen disposed around the bowl. A canopy portion of the bowl overlaps the separator screen and is axially positionable therealong such that a variable length of the separator screen may extend beyond the forward edge of the bowl. A separator drive shaft has an axial bore for housing a bowl drive column and an adjusting rod. The bowl drive column is mounted to the separator drive shaft and adjusting rod such that axial movement of the adjusting rod causes axial movement of the bowl drive column but not the separator drive shaft and rotation of the separator drive shaft causes rotation of the bowl drive column but not the adjustment rod. A threaded surface on the adjusting rod threadably engages an adjustment spindle such that rotation of the adjustment spindle causes the adjusting rod to move longitudinally and adjust the position of the canopy portion in relation to the screen. A scale is coordinated with a pointing device mounted to the adjusting rod to provide a means for determining the length of the separating screen which extends beyond the edge of the bowl.

3 Claims, 3 Drawing Sheets

METHOD FOR VARYING THE EXPOSURE OF DRAINAGE SCREEN SECTION WITHIN A CENTRIFUGAL SEPARATOR

This is a divisional of application Ser. No. 08/631,564 filed on Apr. 12, 1996 now U.S. Pat. No. 5,788,861.

BACKGROUND OF THE INVENTION

This invention relates generally to centrifugal separators. More particularly, the present invention relates to a new and improved centrifugal separator for separating a liquid material from a particulate material.

As shown in the Derton et al U.S. Pat. No. 4,135,659, issued Jan. 23, 1979, centrifugal separators of the horizontal type have been provided for handling slurries of metal chips, metal turnings, or other particulate matter obtained from milling operations. Centrifugal force generated by rotating the separator bowl throws the slurry against the side of the bowl and moves it towards the rim. The rim area is provided with a screen comprised of a series of axially parallel rods forming a slotted surface through which the liquid is discharged under the influence of the centrifugal force. This drainage screen may be permanently mounted to the bowl or may be attached in a manner which allows removal and reinstallation of different drainage screens. The discharged liquid is collected in a chamber which surrounds the drainage screen while the particulate matter glides axially along the rods and is discharged over the rim of the bowl.

The drainage screen of such a bowl is of fixed axial length. However, it has been shown that the performance of the separator is affected by the characteristics of the slurry and that a particular drainage screen surface area may or may not perform adequately for a given slurry. For example, different solid materials, different solid particle shapes, and slurries having different liquid/solid ratios behave differently as they pass over the drainage area.

In addition, the slurry liquid serves as a lubricant, facilitating movement of the solid materials. If all of the liquid is removed from the slurry prematurely, the solid materials may form a "beach", blinding the drainage area and impairing movement of the solid materials.

Separators which utilize removable drainage screens may allow the use of screens which have drainage characteristics customized to particular slurries. Typically, such separators require disassembly of the separator, removal of the installed drainage screen, installation of a drainage screen having a more appropriate surface area, and reassembly of the separator. Such operation is cumbersome and time consuming.

SUMMARY OF THE INVENTION

It is an object of the invention to provide a new and improved centrifugal separator which efficiently separates the liquid and particulate constituents of slurries having different particulate concentrations, shapes, and compositions without the necessity for changing the drainage screen.

It is another object of the invention to provide a new and improved centrifugal separator wherein the effective drainage area of the screen may be modified or adjusted without replacement of the screen. Included in this object is the provision for a new and improved centrifugal separator that obviates the formation of a beach and blinding of the drainage screen by the particulate matter.

Other objects will be in part obvious and in part pointed out more in detail hereinafter.

These and related objects and advantages are provided in accordance with the present invention by utilizing a drainage or separator screen wherein the effective surface area of the separator screen may be adjusted without removing and replacing the separator screen. A screen canopy is provided for covering a portion of the separator screen and is adjustable relative thereto for changing the surface area of the separator screen that is exposed to the slurry.

In a preferred embodiment, the rotating bowl includes the canopy and drive shafts mounted to the bowl and to the screen are keyed to each other such that the drive shafts are axially moveable relative to each other and rotation of the screen drive shaft causes rotation of the bowl drive shaft. A positioning rod rotatably mounted to the bowl drive shaft engages a positioning and indexing subassembly that provides a means for controlling the relative axial movement of the canopy and for determining the axial length of the drainage screen that extends beyond the forward rim of the bowl canopy.

The present invention may be better understood and its numerous objects, advantages, features, properties and relationships will become apparent to those skilled in the art by reference to the following detailed description and accompanying drawings which set forth an illustrative embodiment and is indicative of the way in which the principles of the invention are employed.

DETAILED DESCRIPTION OF THE PREFERRED EMBODIMENT

Figure 1:
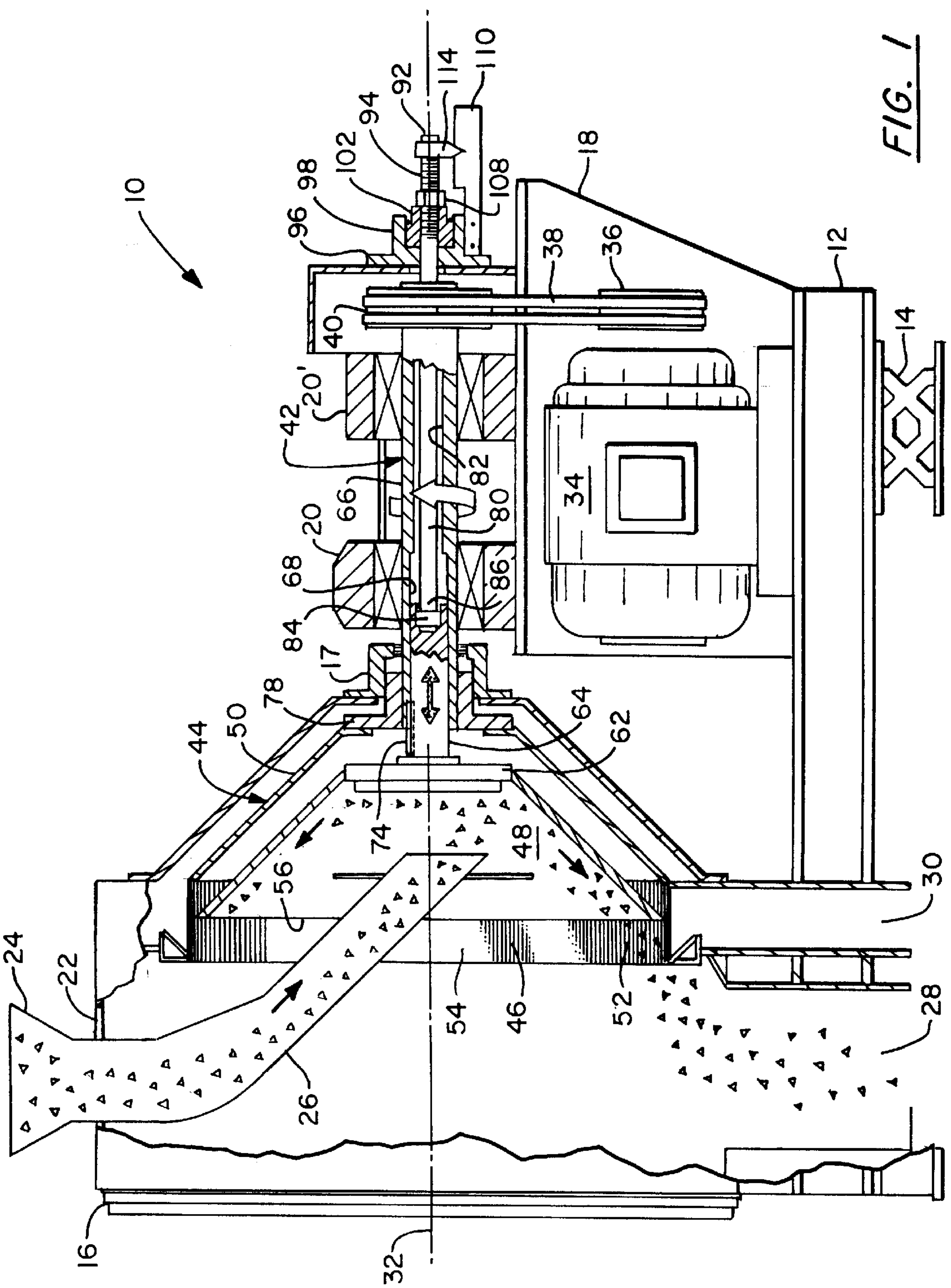
FIG. 1 is a side elevational view, partly broken away and partly in section, of a centrifugal separator in accordance with the invention.

With reference to the drawings wherein like numerals represent like parts throughout the several figures, a centrifugal separator 10 in accordance with the present invention is shown in FIG. 1 as comprising an appropriate support such as a base 12 elevated above the floor by vibration isolation mounts 14. Fixedly mounted to the base is a front separation compartment 1 6 wherein the particulate slurry is fed for separation and a rear separator drive mount 18 including a pair of axially aligned bearings 20, 20' for rotatably supporting the separator drive assembly 42 and the entire rotating separator mechanism 44. The front compartment 16 has a large top inlet port 22 of sufficient size not only to receive a feed hopper 24 and chute 26 but also to permit forward and rearward adjustment of the chute 26 within the port 22. The bottom of the front compartment 16 is provided with a large stationary discharge chute 28 for receiving the separated metal chips, turnings and/or other materials and a separate effluent drain 30 for the liquid removed from the feed slurry. The feed chute 26 extends into the central portion of the front compartment 16, terminating adjacent the operating center of the separator mechanism 44 at approximately the horizontal axis thereof, designated by the numeral 32, that passes through the support bearings 20.

An electric motor 34 is secured to the base 12 adjacent the rear drive mount 18 and is provided with a drive pulley 36 that furnishes rotational movement to the drive assembly 42 through the drive belts 38 interconnecting the drive pulley 36 with the driven pulley 40 secured to the drive assembly 42. The rotatable drive assembly 42 includes a tubular drive shaft 66 that is rotatably supported by the pair of bearings 20, 20' and extends through a bearing sleeve 17 in the rear wall of the front compartment 16 for rotatably driving the separator mechanism 44 positioned therein.

Figure 2:
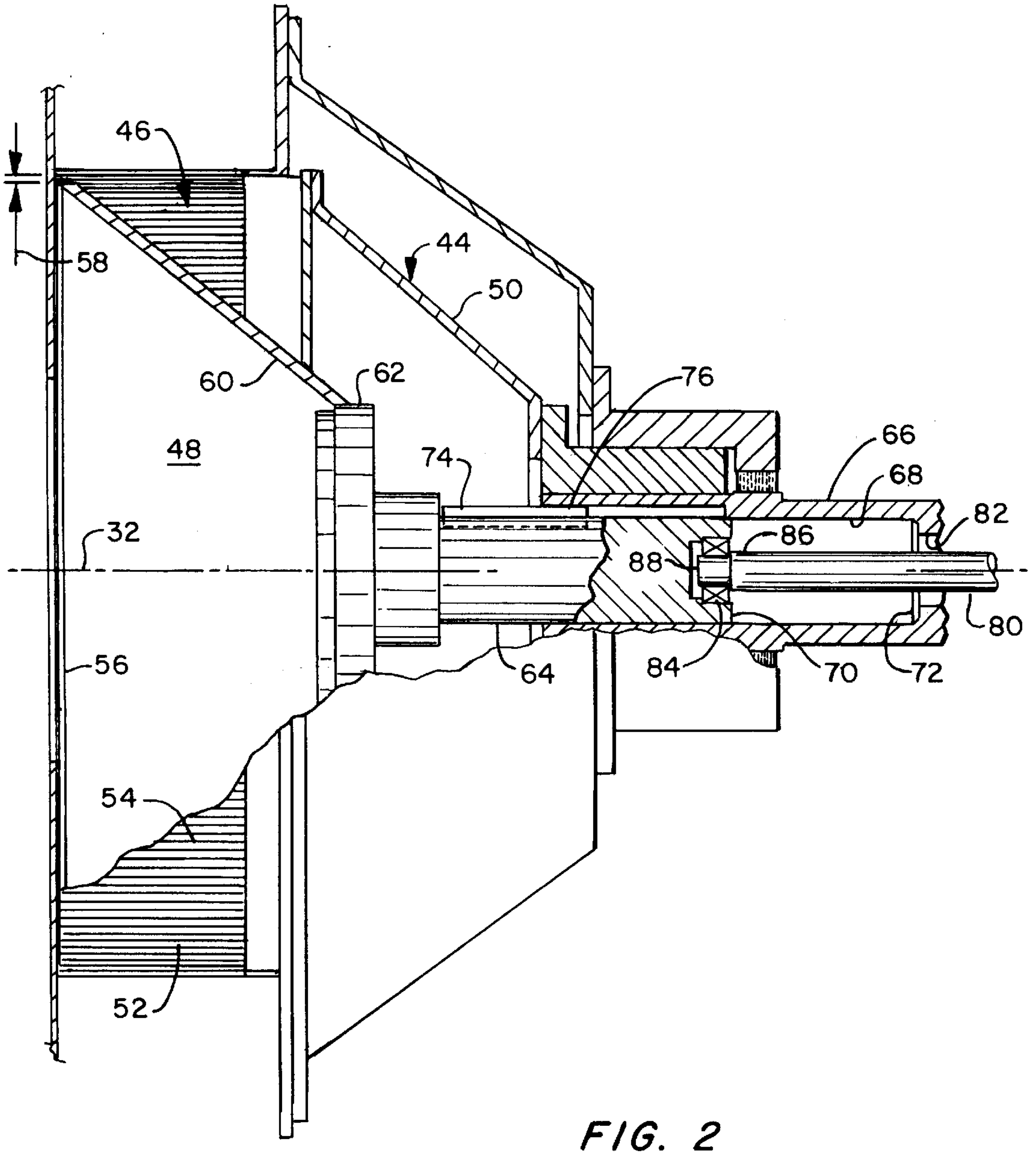
FIG. 2 is an enlarged sectional view of the separation zone of the separator of FIG. 1 with zero screen area exposed.

As best seen in FIG. 2, the rotatable separator mechanism 44 positioned within the front compartment 16 consists essentially of a generally cylindrical screen 46 and an overlapping slurry dispersing or spreading chip bowl 48 that move axially relative to the screen 46 to expose more or less of the screen's surface area. The cylindrical screen 46 is fixedly secured to a frustoconical support member 50 having a taper complimentary to the taper of the chip bowl 48 so that the two members 48, 50 readily interfit, one within the other. In turn, the screen support member 50 is secured to the tubular drive shaft 66 for rotatably driving the screen.

As shown, the cylindrical separator screen 46 consists of a plurality of axially extending parallel rods forming a plurality of screen openings 52 through which the liquid in the slurry is discharged under the influence of the centrifugal force generated by the rotation of the screen 46. The openings 52 are sized such that particulate matter that is larger than the screen openings 52 within the slurry slides along the working surface 54 of the screen 46 as the liquid and some particulate matter that is smaller than the openings 52 passes through the openings 52. The length of the screen rods and therefore the axial extent of the screen's working surface 54 may vary with the intended use of the separator but typically is at last about five inches. Screen openings may be transverse to flow if required for the application.

The larger diameter front rim or lip 56 of the chip bowl 48 is at all times positioned closely adjacent the working surface 54 of the separator screen 46 but is spaced therefrom to define a gap 58 therebetween that is sized such that the particulate matter in the slurry may not pass through the gap 58. Therefore, the chip bowl 48 provides a screen-covering canopy 60 that controls the axial extent of the working surface 54 exposed to the slurry. The base 62 of the bowl 48 is fixedly secured to a rearwardly extending support column 64 that extends into a counterbore 68 in the forward end of the tubular drive shaft 66 extending through the bearing sleeve 17 in the back wall of the front separation compartment 16. As shown in FIG. 2, the column 64 is of such a length that it is fully supported in the drive shaft 66 when the chip bowl 48 is in its full forward position and the counterbore 68 extends rearwardly a sufficient distance to fully receive the column 64 when the bowl 48 is fully retracted. The rearward end 70 of the column 64 preferably seats at the end 72 of the counterbore 68 to limit further retraction of the bowl 48 and prevent inadvertent damage to the bowl 48 and/or screen support 78. The column 64 is further slidably keyed to the drive shaft 66 by the key 74, FIG. 1, to provide a rotary drive connection between the drive shaft 66 and the column 64. The drive shaft 66 is fixedly keyed to the hub of the screen support 78 at 76 whereby the shaft 66 simultaneously rotatably drives both the chip bowl 48 and the screen 46 with nb relative rotation therebetween.

In accordance with the present invention, the centrifugal separator 10 is provided with a mechanism for adjustably positioning the chip bowl 48 relative to the separating screen 46. This includes the provision of an adjusting rod 80 extending through the bore 82 in the tubular drive shaft 66 and its forwardmost end 86 secured to a bearing 84 held within a blind bore 88 in the rearward end 70 of the chip bowl's support column 64. This connection permits the column 64 to freely rotate relative to the adjustment rod 80 without imparting any rotational movement to the rod 80. The adjustment rod 80 extends rearwardly beyond the drive shaft 66 and the driven pulley 40 secured thereto and is provided with threads 94 for a considerable length at its rearward end 92.

Figure 3:
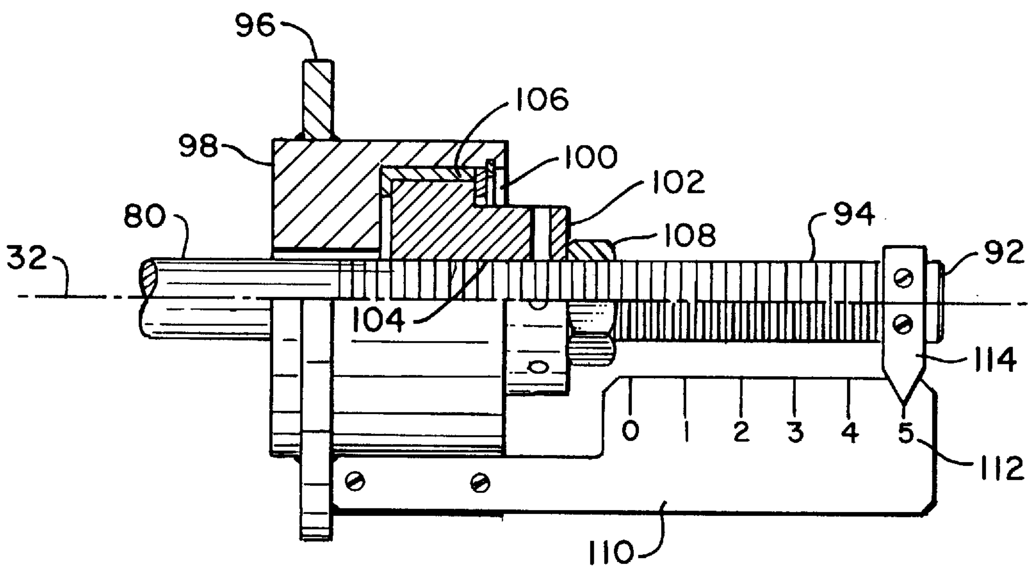
FIG. 3 is a further enlarged side elevational view, partly in section and partly in phantom, of the indexing and positioning portion of the separator of FIG. 1 when a maximum screen area is exposed.

An adjustment support 96 carried by the rear drive mount 20' includes, as best seen in FIG. 3, an adjustment block 98 mounted on the support 96. The block 98 is provided with an enlarged rearwardly facing recess 100 for receiving a hand actuated adjustment spindle 102. As shown, the spindle 102 has a central threaded bore 104 that engages the threads 94 on the adjustment rod 80 so that as the spindle 102 is rotated, the rod 80 is moved axially in either a forward or rearward direction. Such movement in turn will drive the chip bowl 48 axially relative to the screen support 78 thereby exposing more or less of the separating screen 46. An appropriate slide bearing 106 is positioned between the adjustment block 98 and the spindle 102 to facilitate rotation of the spindle 102. A lock nut 108 is also provided rearwardly of the spindle 102 for locking the rod 80 to the spindle 102 after the rod 80 has been appropriately positioned.

Secured to the adjustment block 98 is a rearwardly extending scale 110, FIG. 3, having indicia 112 thereon corresponding to the position of the chip bowl 48 and therefore indicating the axial length of the exposure of the screen 46 to the slurry. An indicator device 114, such as the pointer, secured to the free rearward end 92 of the adjusting rod 80 will move along the scale 110 as the rod 80 is adjusted between a full forward position as depicted in FIG. 2, a full rearward position shown in FIG. 3 and an intermediate position as illustrated in FIG. 1.

Typically prior to startup, the chip bowl 48 is advanced to the furthest forward position, FIG. 2, and then retracted such that approximately one inch of the separator screen 46 extends beyond the lip 56 of the chip bowl 48. The centrifugal separator 10 is started and the operator observes the dryness of the particulate material that is discharged. If the particulate material is not sufficiently dry, the operator retracts the chip bowl 48 a further distance by simply rotating the adjustment spindle 102, exposing additional separator screen surface area. When satisfactory results are observed, the operator stops retracting the chip bowl 48 and secures the lock nut 108 to the adjustment spindle 102. Should the characteristics of the slurry change during operation, the operator may reposition the chip bowl 48 to optimize the drying of the particulate matter.

It should be appreciated that the bowl may be mounted to the drive shaft and the separator screen may be mounted to the support column such that the separator screen moves longitudinally. It should also be appreciated that the support column may be extended longitudinally to eliminate the adjusting rod wherein a nut which is rotatably journaled to the adjustment support engages a threaded surface of the rearward end portion of the support column.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for separating the particulate component of a fluid-particulate mix upon rotation of a separator about a rotational axis, the separator having a spreader member for initially receiving and diffusing the mix to be separated and a screening member having a surface area for receiving the mix from the spreader member and separating the mix, comprising the steps of:

feeding said mix to said spreader member while rotating said spreader member and axially adjusting the position of said spreader member relative to said screening member to expose more or less of the screening member's surface area receiving said mix from said spreader.

2. The method of claim 1 wherein the step of adjusting comprises axially moving the spreading member a controlled distance.

3. The method of claim 1 wherein the screen and the spreader member define a gap therebetween, and the step of adjusting is effected without substantially changing the gap between the screen and the spreader member.

* * * * *